United States Patent
Hynes et al.

(10) Patent No.: US 9,555,800 B2
(45) Date of Patent: Jan. 31, 2017

(54) SERVICE DISCONNECT INTERLOCK SYSTEM AND METHOD FOR HYBRID VEHICLES

(71) Applicant: Allison Transmission, Inc., Indianapolis, IN (US)

(72) Inventors: William J. Hynes, Sheridan, IN (US); Steven Morey, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 88 days.

(21) Appl. No.: 14/599,764

(22) Filed: Jan. 19, 2015

(65) Prior Publication Data

US 2015/0151740 A1    Jun. 4, 2015

Related U.S. Application Data

(63) Continuation of application No. PCT/US2014/017964, filed on Feb. 24, 2014.

(Continued)

(51) Int. Cl.
*B60W 20/00* (2016.01)
*B60W 50/02* (2012.01)
(Continued)

(52) U.S. Cl.
CPC ............ *B60W 20/50* (2013.01); *B60L 3/0046* (2013.01); *B60L 3/0069* (2013.01); *B60L 3/04* (2013.01); *B60L 3/12* (2013.01); *B60L 11/1879* (2013.01); *B60W 50/0205* (2013.01); *B60W 50/035* (2013.01); *B60W 50/04* (2013.01); *B60K 2001/0455* (2013.01); *B60K 2006/4825* (2013.01); *B60L 1/003* (2013.01);
(Continued)

(58) Field of Classification Search
None
See application file for complete search history.

(56) References Cited

U.S. PATENT DOCUMENTS 5,378,555 A    1/1995  Waters
6,139,351 A    10/2000 Schaefer et al.
(Continued)

FOREIGN PATENT DOCUMENTS

EP    2 211 439 A1    7/2010
WO   WO 2010/092330 A1   8/2010
WO   WO 2012/078721 A2   6/2012

OTHER PUBLICATIONS

International Search Report and Written Opinion issued in PCT/US2014/017964, dated Jun. 24, 2014, 11 pgs.

*Primary Examiner* — Rami Khatib
(74) *Attorney, Agent, or Firm* — Woodard Emhardt Moriarty McNett & Henry LLP

(57) ABSTRACT

A method of servicing a hybrid system is disclosed wherein the hybrid system includes a detected fault. As a result of the detected fault the hybrid system has been disabled. The hybrid system includes a controller and a service detection interlock (SDI). The method steps include first powering up the controller and then assessing a special fault flag status. If a special fault flag is set, the next step is to check to see if the SDI is removed. If the SDI is removed then the special fault flag is cleared while the hybrid system remains disabled. The controller is then powered down with the key-off input and with the next key-on input, the hybrid system can be enabled.

20 Claims, 5 Drawing Sheets

Related U.S. Application Data

(60) Provisional application No. 61/788,367, filed on Mar. 15, 2013.

(51) Int. Cl.

| | | |
|---|---|---|
| *B60W 50/04* | (2006.01) | |
| *B60W 50/035* | (2012.01) | |
| *B60L 3/04* | (2006.01) | |
| *B60L 3/12* | (2006.01) | |
| *B60L 11/18* | (2006.01) | |
| *B60K 1/04* | (2006.01) | |
| *B60K 6/48* | (2007.10) | |
| *B60L 1/00* | (2006.01) | |
| *B60L 1/02* | (2006.01) | |
| *B60L 3/00* | (2006.01) | |
| *B60L 11/00* | (2006.01) | |
| *B60L 11/14* | (2006.01) | |
| *B60L 11/16* | (2006.01) | |

(52) U.S. Cl.
CPC ............. *B60L 1/02* (2013.01); *B60L 3/003* (2013.01); *B60L 3/0061* (2013.01); *B60L 11/005* (2013.01); *B60L 11/14* (2013.01); *B60L 11/16* (2013.01); *B60L 2210/10* (2013.01); *B60L 2240/80* (2013.01); *B60L 2250/12* (2013.01); *B60L 2260/28* (2013.01); *B60L 2270/145* (2013.01); *B60L 2270/40* (2013.01); *B60W 2050/043* (2013.01); *Y02T 10/6252* (2013.01); *Y10S 903/903* (2013.01)

(56) References Cited

U.S. PATENT DOCUMENTS

| | | | |
|---|---|---|---|
| 6,189,635 B1 | 2/2001 | Schuler | |
| 6,441,588 B1 | 8/2002 | Yagi et al. | |
| 6,469,403 B2 | 10/2002 | Omata et al. | |
| 6,518,732 B2 | 2/2003 | Palanisamy | |
| 6,632,560 B1 | 10/2003 | Zhou | |
| 6,686,724 B2 | 2/2004 | Coates et al. | |
| 6,727,676 B2 | 4/2004 | Ochiai | |
| 6,904,342 B2 | 6/2005 | Hanada et al. | |
| 7,009,401 B2 | 3/2006 | Kinoshita et al. | |
| 7,015,676 B2 | 3/2006 | Kohama et al. | |
| 7,021,409 B2 | 4/2006 | Tamor | |
| 7,078,877 B2 | 7/2006 | Salasoo et al. | |
| 7,084,361 B1 | 8/2006 | Bowes et al. | |
| 7,131,708 B2 | 11/2006 | Tao et al. | |
| 7,144,647 B2 | 12/2006 | Sugita | |
| 7,295,902 B2 | 11/2007 | Chen et al. | |
| 7,305,873 B2 | 12/2007 | Hubbard et al. | |
| 7,317,978 B2 | 1/2008 | Ashizawa | |
| 7,402,068 B1 | 7/2008 | Tarchiniski | |
| 7,407,026 B2 | 8/2008 | Tamor | |
| 7,449,891 B2 | 11/2008 | Cawthorne | |
| 7,479,761 B2 | 1/2009 | Okumura | |
| 7,486,036 B2 | 2/2009 | Oyobe et al. | |
| 7,521,935 B2 | 4/2009 | Uchida | |
| 7,538,520 B2 | 5/2009 | Zettel et al. | |
| 7,550,946 B2 | 6/2009 | Zettel et al. | |
| 7,586,722 B2 | 9/2009 | Scholer et al. | |
| 7,613,003 B2 | 11/2009 | Pavlovic et al. | |
| 7,631,712 B2 | 12/2009 | Watanabe | |
| 7,639,018 B2 | 12/2009 | Zettel et al. | |
| 7,645,209 B2 | 1/2010 | Dreibbolz et al. | |
| 7,654,932 B2 | 2/2010 | Gohring et al. | |
| 7,657,350 B2 | 2/2010 | Moran | |
| 7,661,370 B2 | 2/2010 | Pike et al. | |
| 7,677,341 B2 | 3/2010 | Tomo | |
| 7,719,238 B2 | 5/2010 | Iida et al. | |
| 7,730,984 B2 | 6/2010 | Heap et al. | |
| 7,768,235 B2 | 8/2010 | Tae et al. | |
| 7,770,676 B2 | 8/2010 | Tenbrock et al. | |
| 7,770,678 B2 | 8/2010 | Nozaki et al. | |
| 7,784,575 B2 | 8/2010 | Yamanaka et al. | |
| 7,795,844 B2 | 9/2010 | Ichikawa et al. | |
| 7,800,345 B2 | 9/2010 | Yun et al. | |
| 7,813,865 B2 | 10/2010 | Martin | |
| 7,828,693 B2 | 11/2010 | Soliman et al. | |
| 7,836,985 B2 | 11/2010 | Itoh | |
| 7,863,789 B2 | 1/2011 | Zepp et al. | |
| 7,865,287 B2 | 1/2011 | Huseman | |
| 7,878,282 B2 | 2/2011 | Kumazaki et al. | |
| 7,893,637 B2 | 2/2011 | Suhama et al. | |
| 7,908,064 B2 | 3/2011 | Cawthorne et al. | |
| 7,923,950 B2 | 4/2011 | Takahashi | |
| 7,928,699 B2 | 4/2011 | Kohn | |
| 7,935,015 B2 | 5/2011 | Tabata et al. | |
| 7,967,091 B2 | 6/2011 | Yamazaki et al. | |
| 7,977,896 B2 | 7/2011 | Heap et al. | |
| 7,987,934 B2 | 8/2011 | Huseman | |
| 7,998,023 B2 | 8/2011 | Holmes et al. | |
| 8,000,866 B2 | 8/2011 | Heap et al. | |
| 8,002,667 B2 | 8/2011 | Hsieh et al. | |
| 8,010,247 B2 | 8/2011 | Heap et al. | |
| 8,020,652 B2 | 9/2011 | Bryan et al. | |
| 8,022,674 B2 | 9/2011 | Miura | |
| 8,029,408 B2 | 10/2011 | Seel | |
| 8,030,883 B2 | 10/2011 | Katayama | |
| 8,035,324 B2 | 10/2011 | Heap | |
| 8,035,349 B2 | 10/2011 | Lubawy | |
| 8,047,959 B2 | 11/2011 | Fuechtner et al. | |
| 8,053,921 B2 | 11/2011 | Ichikawa | |
| 8,063,609 B2 | 11/2011 | Salasoo et al. | |
| 8,078,417 B2 | 12/2011 | Ishishita | |
| 8,082,743 B2 | 12/2011 | Hermann et al. | |
| 8,091,667 B2 | 1/2012 | Zettel et al. | |
| 8,098,050 B2 | 1/2012 | Takahashi | |
| 8,924,049 B2 * | 12/2014 | Kumar | B61L 27/0027 |
| | | | 701/19 |
| 2002/0011935 A1 | 1/2002 | Kim | |
| 2006/0115721 A1 * | 6/2006 | Lee | H01M 10/4207 |
| | | | 429/156 |
| 2006/0216582 A1 * | 9/2006 | Lee | H01M 2/1077 |
| | | | 429/120 |
| 2007/0090803 A1 | 4/2007 | Yun et al. | |
| 2007/0111089 A1 | 5/2007 | Swan | |
| 2008/0018111 A1 | 1/2008 | Yaguchi | |
| 2008/0050645 A1 | 2/2008 | Kai et al. | |
| 2008/0215201 A1 | 9/2008 | Okubo et al. | |
| 2008/0224478 A1 | 9/2008 | Tamor | |
| 2009/0037060 A1 | 2/2009 | Carlhammar et al. | |
| 2009/0053588 A1 | 2/2009 | Marukawa | |
| 2009/0086462 A1 | 4/2009 | Funato et al. | |
| 2009/0118929 A1 | 5/2009 | Heap et al. | |
| 2009/0118941 A1 | 5/2009 | Heap | |
| 2009/0118964 A1 | 5/2009 | Snyder et al. | |
| 2009/0118971 A1 | 5/2009 | Heap et al. | |
| 2009/0157243 A1 | 6/2009 | Kim | |
| 2009/0204280 A1 | 8/2009 | Simon, Jr. | |
| 2009/0234524 A1 | 9/2009 | Kim | |
| 2009/0243518 A1 | 10/2009 | Itoh | |
| 2009/0243554 A1 | 10/2009 | Gu et al. | |
| 2009/0260903 A1 | 10/2009 | Park | |
| 2009/0308674 A1 | 12/2009 | Bhattarai et al. | |
| 2010/0075206 A1 * | 3/2010 | Tamura | H01M 2/1077 |
| | | | 429/62 |
| 2010/0099015 A1 * | 4/2010 | Kawai | H01M 10/625 |
| | | | 429/62 |
| 2010/0116235 A1 | 5/2010 | Imamura et al. | |
| 2010/0125019 A1 | 5/2010 | Tabata et al. | |
| 2010/0222953 A1 | 9/2010 | Tang | |
| 2010/0250037 A1 | 9/2010 | Yoshida et al. | |
| 2010/0250042 A1 | 9/2010 | Shamoto | |
| 2010/0255360 A1 * | 10/2010 | Umemoto | H01M 2/24 |
| | | | 429/120 |
| 2010/0262308 A1 | 10/2010 | Anderson et al. | |
| 2010/0263952 A1 | 10/2010 | Richter et al. | |
| 2010/0286855 A1 | 11/2010 | Yang | |
| 2010/0299036 A1 | 11/2010 | Vespasien | |
| 2010/0312422 A1 | 12/2010 | Imaseki | |
| 2011/0010032 A1 | 1/2011 | Kozarekar | |

(56) References Cited

U.S. PATENT DOCUMENTS

| | | |
|---|---|---|
| 2011/0040433 A1 | 2/2011 | Steuernagel |
| 2011/0048823 A1 | 3/2011 | Connolly et al. |
| 2011/0125352 A1 | 5/2011 | McGrogan et al. |
| 2011/0130904 A1 | 6/2011 | McGrogan et al. |
| 2011/0301791 A1 | 12/2011 | Swales et al. |
| 2011/0320075 A1 | 12/2011 | Kim et al. |
| 2012/0231315 A1* | 9/2012 | Yoon .................. H01M 10/657 429/120 |
| 2012/0282510 A1* | 11/2012 | Youngs .................. B60K 6/28 429/120 |

* cited by examiner

SERVICE DISCONNECT INTERLOCK SYSTEM AND METHOD FOR HYBRID VEHICLES

CROSS REFERENCE TO RELATED APPLICATION

This application is a continuation of International Application No. PCT/US2014/017964 filed Feb. 24, 2014 which claims the benefit of U.S. Provisional Application No. 61/788,367 filed Mar. 15, 2013, which are hereby incorporated by reference.

BACKGROUND OF THE INVENTION

Over the past few years, there has been a growing concern over global climate change due to an increase in carbon dioxide levels as well as oil supply shortages. As a result, some automobile manufactures and consumers are beginning to have a greater interest in motor vehicles having low emissions and greater fuel efficiency. One viable option is a hybrid electric vehicle (HEV) which allows the vehicle to be driven by an electric motor, combustion engine, or a combination of the two.

Though various features are important to the overall HEV design, the system which stores the energy available for use by the vehicle is a key component. The energy storage system is provided within the HEV to store the energy created by a generator in order for that energy to be available for use by the hybrid system at some later time. For example, the stored energy may be used to drive an electric motor to independently propel the motor vehicle or assist the combustion engine, thereby reducing gasoline consumption.

However, energy storage systems face a variety of design complications, such as over-heating, weight, complexity, ease of incorporation into the vehicle, ease of service, and cost, just to name a few. Additionally, known energy storage systems utilize only a specific and known number of battery packs or modules designed to meet a particular HEV design specification. For example, a battery pack may be specifically designed to provide a specific amount of energy for a 300V vehicle. However, when a different amount of energy is required, such as a 600V system, a different battery pack must be designed to meet the needs of that application. Known battery packs and storage systems can not be utilized or otherwise implemented into different settings without a considerable amount of re-engineering and re-working.

Some known systems allow for separate battery packs to be electrically connected to a separate and distinct control box. Though the independent battery packs may be added to or removed from the overall system, the separate control box is still required. However, because available space for HEV components is at a premium, the inclusion of a separate and distinct control box should be avoided. Additionally, in the event the separate control box fails, the entire energy storage system is unable to function. Thus, there is a need for improvement in this field.

One envisioned area of improvement relates to the safe operation of the HEV, including safety during repair and servicing. In conjunction with the safe operation of a hybrid vehicle, diagnostic tools are included as a part of the control circuitry. Preferably, system failures would be detectable so that repair or service decisions can be made in a timely manner without risking damage to the vehicle or to its components.

While some hybrid system failures can cause damage to hybrid components, other hybrid system failures can cause risks of uncontrolled energy, such as if contactors are closed with the failure not fixed. Some of these failures can only be detected after attempting to enable the hybrid system.

Certain failures can cause further damage if the hybrid system is enabled before the fault is actually repaired, and some of these can come with the risk of uncontrolled energy. Some of these faults require the hybrid system to be enabled (or commanded enabled) to detect, which means the verification of a successful service routine requires an attempt to enable the hybrid system. This attempt, if no service routine was performed, could momentarily re-expose the hybrid system to the fault condition. The disclosed embodiment provides significant confidence to the hybrid system controls that a service routine has been performed and that a subsequent hybrid system enable routine is likely to be successful. The disclosed service disconnect interlock system and method provides an arrangement which allows detection that a repair or service routine has been performed before enabling the hybrid system and therefore avoiding damage to the hybrid components or reducing the risk of uncontrolled energy.

SUMMARY

In the context of the disclosed service disconnect interlock system and method, it may be helpful to have a general understanding of the exemplary embodiment of the associated energy storage system and of the HEV. Focusing on the energy storage system, an exemplary embodiment includes a plurality of energy storage modules. The energy storage modules include, among other things, a plurality of secondary battery arrays adapted to store high voltage energy. An energy storage controller module is electrically connected to various components within an energy storage module, such as, but not limited to, the battery arrays, a low voltage harness, a thermistor harness, and/or a vehicle signal connector assembly, to name a few examples. The energy storage modules within the energy storage system are adapted to communicate with one another. A pack-to-pack CAN bus is provided between each energy storage module. When multiple energy storage modules are used to comprise the energy storage system, one energy storage module functions as a master energy storage module while the others function as slave energy storage modules. The energy storage controller module within the master energy storage module is adapted to receive information from the slave energy storage modules and communicate with a transmission/hybrid control module and the rest of the hybrid system as a single energy storage system.

The energy storage system comprises at least one energy storage module adapted to supply electrical energy to a hybrid vehicle. The energy storage module comprises a primary enclosure, at least one battery array located within the primary enclosure, and an energy storage controller module located within the primary enclosure and electrically connected to the battery array. The energy storage controller module is further connected to a hybrid control module of the hybrid vehicle by a low voltage connector. A high voltage junction box is attached to a first end of the primary enclosure and has a plurality of high voltage connection terminals. The high voltage junction box has a first opening which corresponds to a second opening of the primary enclosure such that the primary enclosure and high voltage junction box define a sealed cavity. At least one of the high voltage connection terminals is configured to receive a high voltage conductor connected between the energy storage module and an inverter of the hybrid vehicle. A service disconnect is connected in a current path between the high voltage connection terminals and the at least one battery array.

The energy storage system includes a thermal pad disposed between the battery arrays and an interior surface of the primary enclosure. A heat sink is disposed on an exterior surface of the primary enclosure. The heat sink comprises a plurality of fins which may be disposed angularly outward in a symmetrical pattern with respect to a longitudinal axis of the primary enclosure. A fan mounted to an exterior surface of a first end of the primary enclosure is operable to direct air across the fins toward a second end of the primary enclosure. The height or length of the fins may be varied relative to the fan location to provide uniform cooling across the battery cells in the battery array. An enclosing plate is mounted exterior to the heat sink and defining an airflow cavity, wherein the enclosing plate further directs air from the fan across the heat sink.

In the operation of a hybrid vehicle and the corresponding hybrid system, including the described energy storage system, it is acknowledged that certain hybrid system failures can cause damage to hybrid components. There are also risks associated with such failures, such as risks of uncontrolled energy if the contactors are closed with the failure not fixed. Some of these failures can only be detected after attempting to enable the hybrid system.

Certain failures can cause further damage if the hybrid system is enabled before the fault is actually repaired, and some of these can come with the risk of uncontrolled energy. As noted in the Background, some of these faults require the hybrid system to be enabled to detect, which means the verification of a successful service routine requires an attempt to enable the hybrid system. As indicated, the disclosed embodiment provides significant confidence to the hybrid system controls that a service routine has been performed and that a subsequent hybrid system enable routine is likely to be successful.

The disclosed embodiment is directed to allowing detection that a repair or service routine has been performed by enabling the hybrid system. By this approach it should be possible to avoid damage to the hybrid components and reduce the risk of uncontrolled energy.

Further forms, objects, features, aspects, benefits, advantages, and embodiments of the present invention will become apparent from a detailed description and drawings provided herewith.

DETAILED DESCRIPTION

Figure 1:
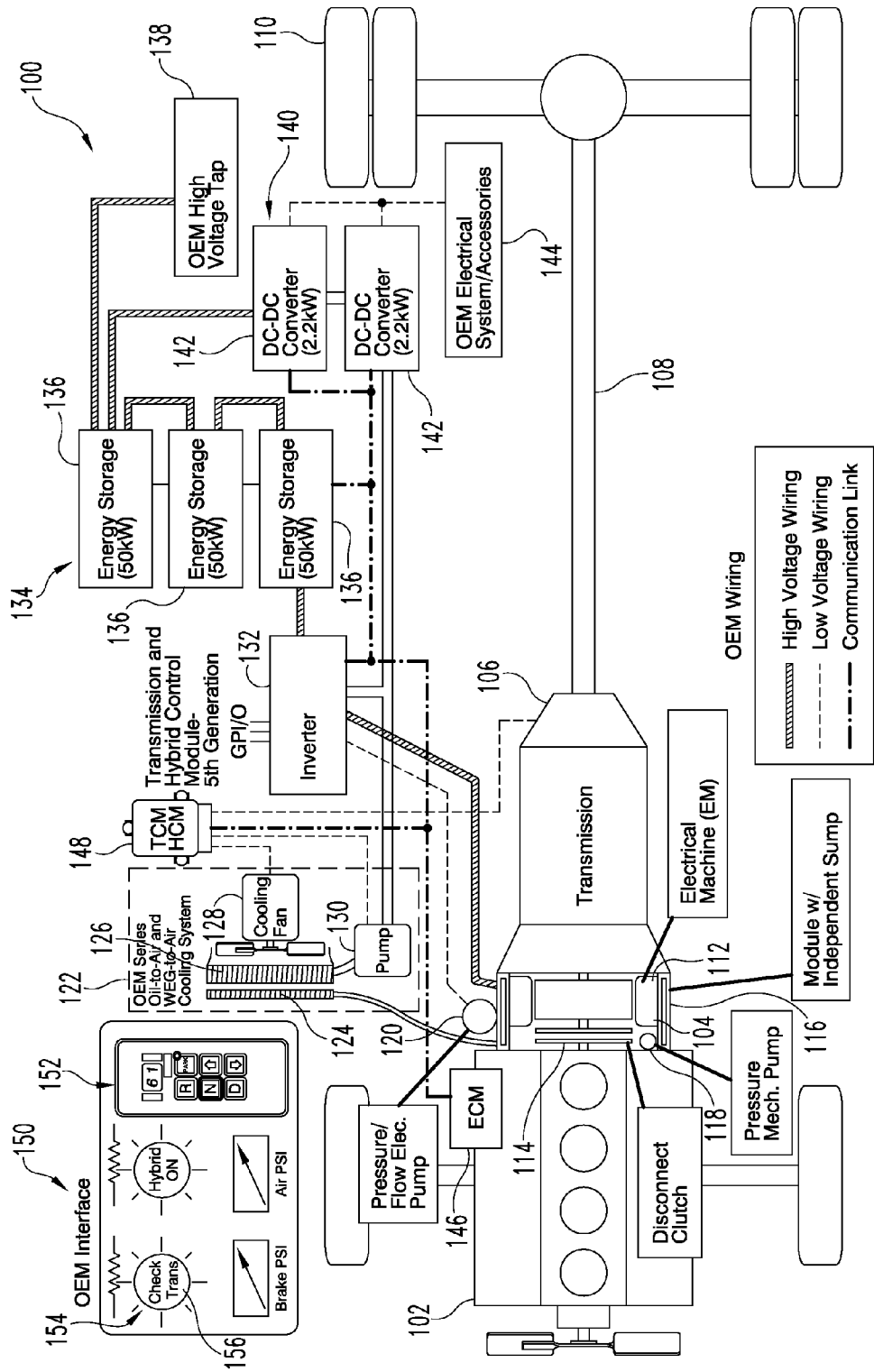
FIG. 1 illustrates a diagrammatic view of one example of a hybrid system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

In order to help with an understanding of the exemplary embodiment, a representative hybrid system is disclosed (see FIG. 1). Also disclosed is a representative communication system (see FIG. 2) and a representative energy storage module (see FIG. 3).

With continued reference to FIG. 1, a diagrammatic view of a representative hybrid system 100 is illustrated. The hybrid system 100 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 from the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant will be used interchangeably herein, these terms are used in a broader sense to include various types of lubricants, such as natural or synthetic oils, as well as lubricants having different properties. To circulate the fluid, the hybrid module 104 includes a mechanical pump 118 and an electrical (or electric) pump 120. With this combination of both the mechanical pump 118 and electrical pump 120, the overall size and, moreover, the overall expense for the pumps is reduced. The electrical pump 120 can supplement mechanical pump 118 to provide extra pumping capacity when required. In addition, it is contemplated that the flow through the electrical pump 120 can be used to detect low fluid conditions for the hybrid module 104.

The hybrid system 100 further includes a cooling system 122 that is used to cool the fluid supplied to the hybrid module 104 as well as the water-ethylene-glycol (WEG) to various other components of the hybrid system 100 which will be described later in further detail. In one variation, the WEG can also be circulated through an outer jacket of the eMachine 112 in order to cool the eMachine 112. It should be noted that the hybrid system 100 will be described with respect to a WEG coolant, but other types of antifreezes and cooling fluids, such as water, alcohol solutions, etc., can be used. Looking at FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1. In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit requires, then, vehicle and product line modifications and expensive testing to ensure the proper operation and safety of the vehicle, and this expenses tends to lessen or slow adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Figure 2:
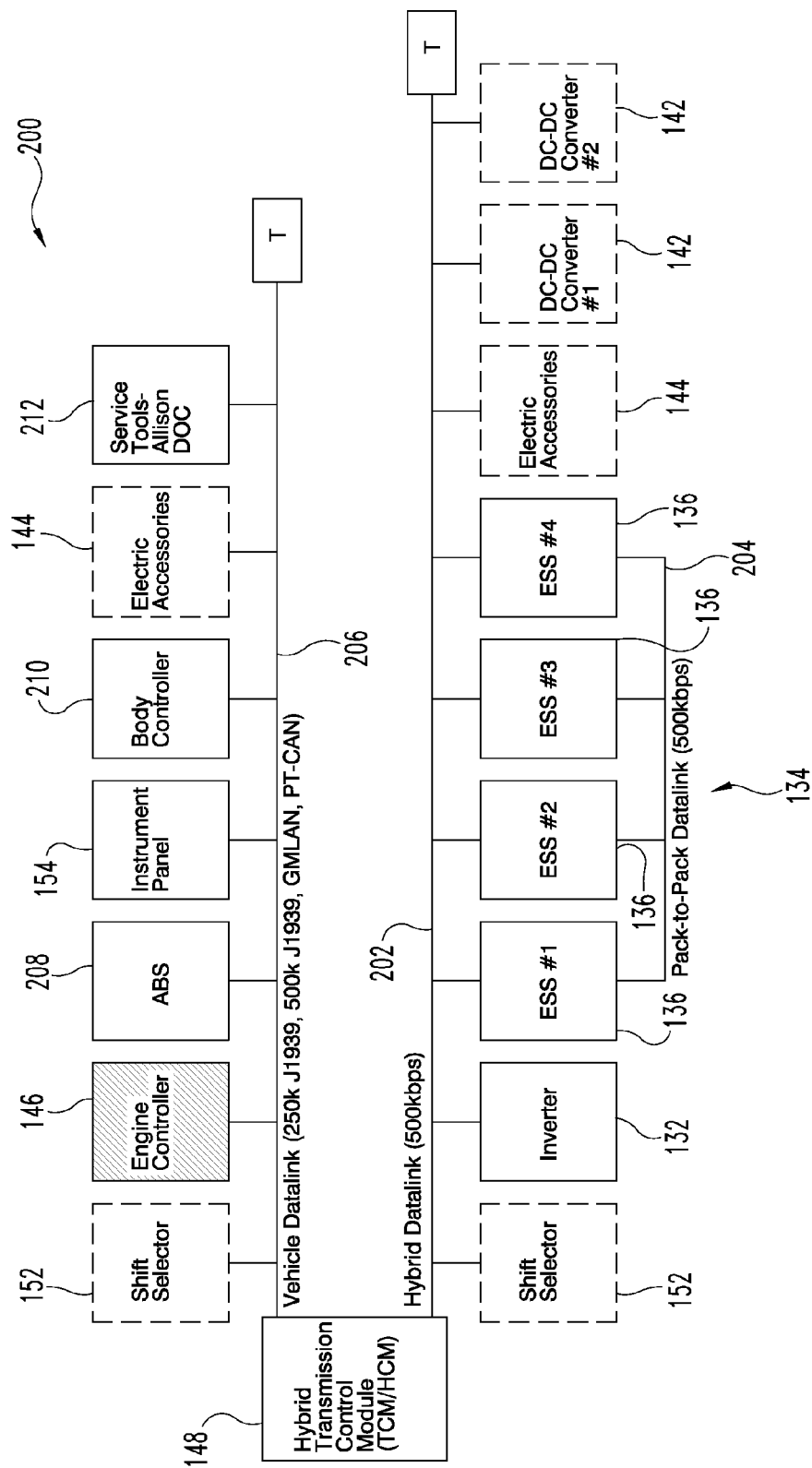
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142. Within the energy storage system 134, an energy storage module data link 204 facilitates communication between the various energy storage modules 136. However, it is contemplated that in other embodiments the various energy storage system modules 136 can communicate with one another over the hybrid data link 202. With the hybrid data link 202 and the energy storage module data link 204 being separate from the data links used in the rest of the vehicle, the control/electrical component of the hybrid system 100 can be readily tied into the vehicle with minimum impact. In the illustrated example, the hybrid data link 202 and the energy storage module data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

In terms of general functionality, the transmission/hybrid control module 148 receives power limits, capacity available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. The transmission/hybrid control module 148 also receives information about the operation of the electrical pump 120 as well as issues commands to the auxiliary electrical pump 120. From the inverter 132, the transmission/hybrid control module 148 receives a number of inputs such as the motor/generator torque that is available, the torque limits, the inverter's voltage current and actual torque speed. Based on that information, the transmission/hybrid control module 148 controls the torque speed and the pump 130 of the cooling system. From the inverter 132, it also receives a high voltage bus power and consumption information. The transmission/hybrid control module 148 also monitors the input voltage and current as well as the output voltage and current along with the operating status of the individual DC-DC converter modules 142 of the DC-DC converter system 140. The transmission/hybrid control module 148 also communicates with and receives information from the engine control module 146 and in response controls the torque and speed of the engine 102 via the engine control module 146.

Figure 3:
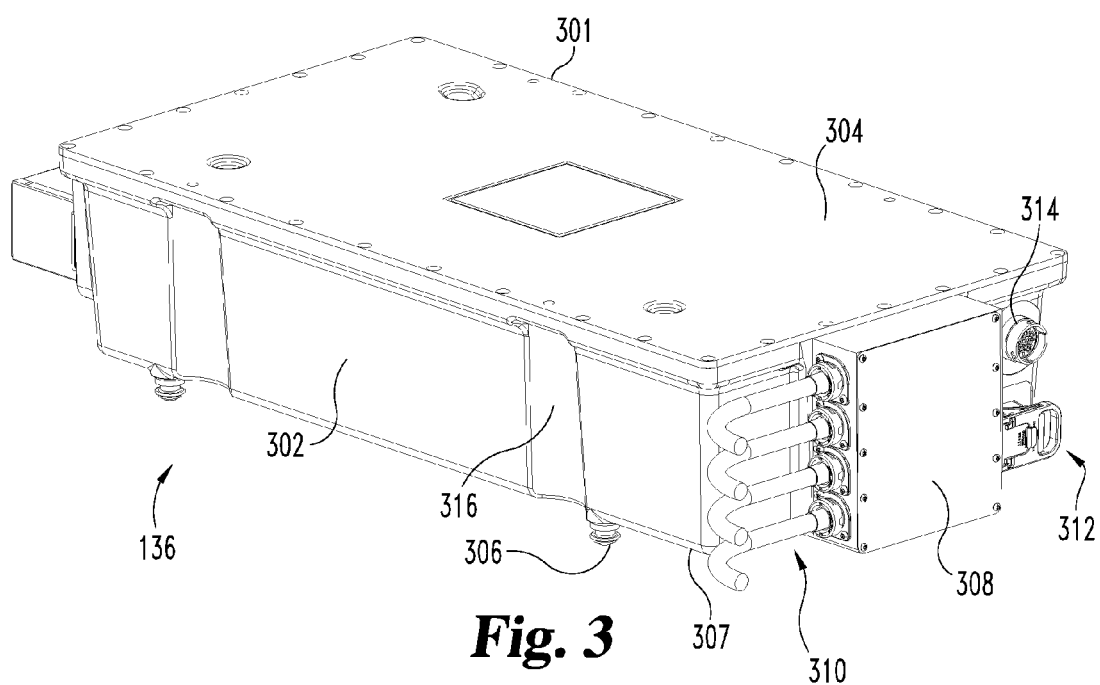
FIG. 3 is a front perspective view of an energy storage module according to one embodiment of the present disclosure.

Turning to FIG. 3, certain embodiments of the energy storage module 136 will now be discussed. As depicted, energy storage module 136 comprises a primary enclosure 301 having a lower housing 302 and an upper cover 304. The lower housing 302 and upper cover 304 are constructed and arranged to withstand large vibrations and high shock loads. In order to provide heavy duty strength for operation in certain environments (i.e., heavy duty trucking) while also being mindful of weight, lower housing 302 and upper cover 304 are constructed of aluminum in one embodiment, though other materials, such as steel, may also be used. According to one embodiment, the energy storage module 136 is constructed to withstand 100 G shock loads and 25 G vibration loads.

A plurality of mounting feet 306 are located on the bottom of lower housing 302 to assist in the mounting of the energy storage module 136 to the HEV body or frame. Additionally, a plurality of indentations 316 are provided around the periphery of lower housing 302 to also assist in the optional stacking of multiple energy storage modules.

Located at one end 307 of the energy storage module 136 is a high voltage junction box 308. As will be described in more detail below, a series of high voltage cables 310 are connected to the high voltage junction box 308 to deliver high voltage power to and from energy storage module 136. The high voltage junction box 308 may be formed integral to the primary enclosure 301 or as a separate unit.

Also provided on the end 307 of the energy storage module 136 are a service disconnect 312 and a low-voltage vehicle signal connector 314. The service disconnect 312 is provided to break the current path between the high voltage energy sources within the primary enclosure 301 and the electronics within the high voltage junction box 308. The service disconnect 312 ensures user safety during service operations of the energy storage module 136. The service disconnect 312 is also important from a safety perspective when servicing or repairing the hybrid system. The vehicle signal connector 314 allows for the energy storage module 136 to be in electrical and communicative connection with other components of the hybrid system, such as, but not limited to, the transmission/hybrid control module 148. In one embodiment, the vehicle signal connector 314 is a forty seven (47) way connector which includes gold terminals. According to one aspect of the present disclosure, the vehicle signal connector 314 is also designed and validated for heavy duty applications. Though the embodiment illustrated in FIG. 3 includes a single vehicle signal connector 314, other embodiments may include two or more signal connectors.

Figure 4:
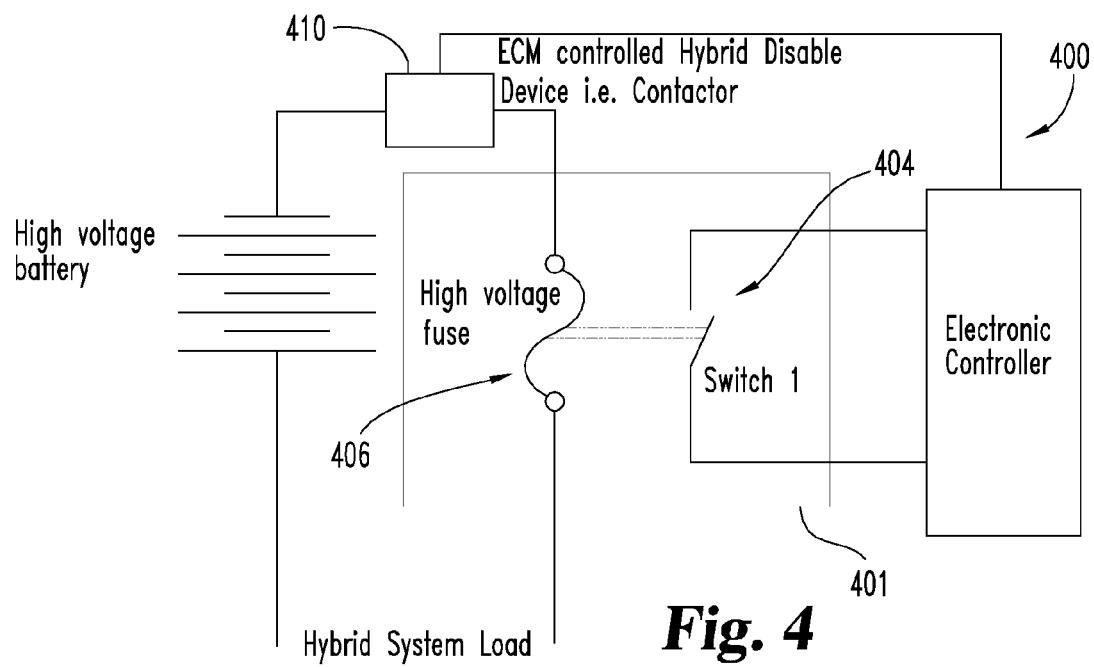
FIG. 4 is a schematic of one embodiment of service disconnect interlock circuitry.
Figure 5:
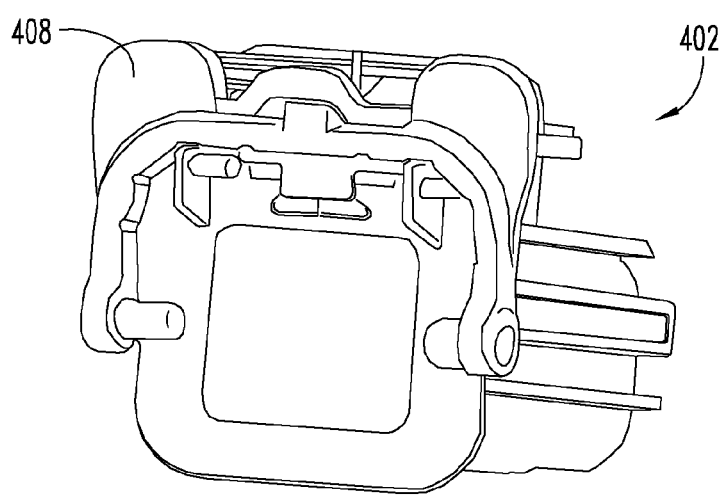
FIG. 5 is a diagrammatic illustration of a service disconnect interlock device.

With reference to FIGS. 4 and 5 typical service disconnect interlock circuitry 400 is disclosed which in the exemplary embodiment includes a service disconnect interlock device 402, of the type illustrated in FIG. 5. Device 402 is identified functionally in the circuitry 400 of FIG. 4 as outlined box 401 which diagrammatically represents the combination of switch 404 and fuse 406. The switch 404 must be opened before the high voltage fuse 406 can be removed. Removal of device 402 is part of the procedure for disconnecting the high voltage. Removal of the fuse 406 is also a part of that procedure. When the handle 408 is "engaged" by pulling or pivoting it back, toward the user, switch 404 is opened. When device 402 is removed (i.e. pulled out), fuse 406 is removed from circuitry 400. Box 410 represents a contactor.

The HEV of the exemplary embodiment includes various diagnostic controls and included as a part of these diagnostic controls is circuitry i.e. a controller or engine control module (ECM) for fault detection. As used in this context, a "fault" is defined broadly and which faults may be detected is generally a function of the selected circuitry configuration of the controller. The detection of a "fault" could be selectively configured as a warning or alert, which may not require repair or may not necessitate immediate servicing. However, in the context of the exemplary embodiment, the "faults" being detected and flagged are those faults which require a repair to be performed in order to protect the hybrid components and/or to control the stored energy of the hybrid system. This type or category of fault is described herein as "special". One of the causes of uncontrolled energy is if the contactors are closed with the failure not fixed. Also in the context of the exemplary embodiment, it is noted that some failures can only be detected after attempting to enable the hybrid system.

In the context of the exemplary embodiment, the acronyms SDI and SDIL are used as being descriptive of the type of service disconnect structure and its control function which are used. SDI refers to Service Disconnect Interlock and SDIL refers to Service Disconnect Interlock Loop. SDI will be used herein as a generic reference for both the structure and its control function. This SDI structure, as represented by device 402 in FIG. 5, is constructed and arranged similar to a service plug or service disconnect 312 which can be physically removed (i.e. unplugged) in order to enable the teachings of the exemplary embodiment. This SDI structure is used in conjunction with the fault detection circuitry to enable the system and method of the exemplary embodiment.

With reference to the flow diagram of FIG. 6, a brief overview of the steps associated with that flow diagram is provided below, followed by a more detailed description. When a failure is detected which has risks of hybrid damage (for example: contactor welded, etc.) or uncontrolled energy (for example: isolation, HVIL open, etc.), a technician must remove the SDI and perform a key-on/key-off cycle before the hybrid system can be re-enabled and detection of a repair can be made. Until this "un-natural act" has occurred, the hybrid system will continue to be disabled and no hardware damage will occur and energy will be contained. In this context the focus is on special faults.

From the perspective of the customer (i.e. driver), the hybrid system senses and signals a fault which requires the type of service action or procedure as described herein. A special fault of this type sets a flag which must be cleared before the disabled hybrid system can be enabled (see FIG. 6). Once a special fault is detected and the controller sets a flag for this fault, the hybrid system is disabled. The driver then takes the HEV in for service at which time the fault is resolved according to a technical service manual (TSM). The service technician removes the SDI, turns the key-on for at least 10 seconds. This key-on step powers up the controller and the special fault flag is noted. With the SDI removed the servicing/repair is performed. The service technician then turns the key-off. The service technician then replaces the SDI and turns the key back and can then clear codes for normal operation and enable the hybrid system. The HEV is then returned to the customer. The specifics of the logic controller and decision paths are illustrated in FIG. 6.

Figure 6:
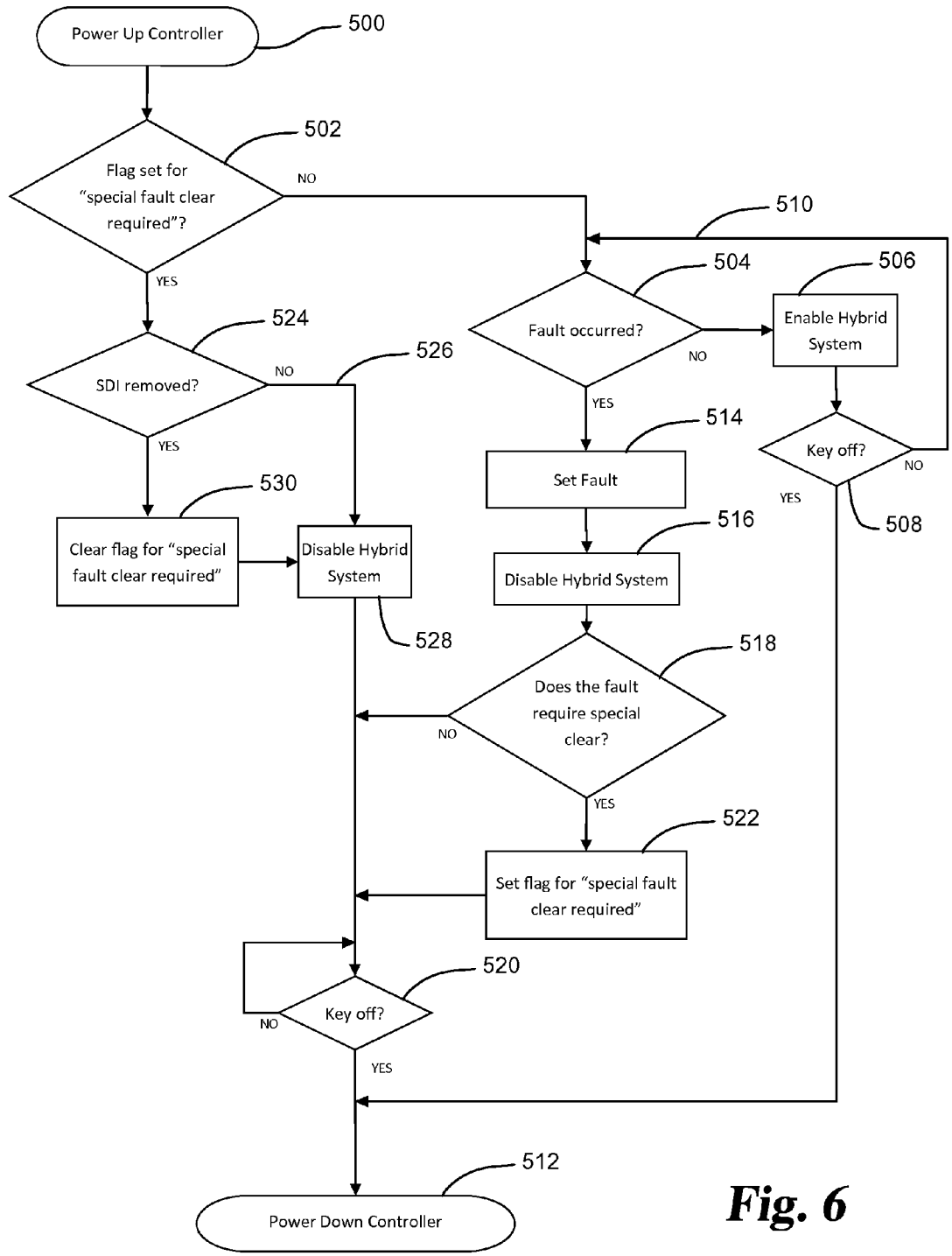
FIG. 6 is a flow diagram corresponding to the disclosed embodiment of a service disconnect interlock system and method for hybrid systems.

With continued reference to FIG. 6, during normal operation of the hybrid vehicle, if a fault is detected that requires a repair to be performed to protect the hybrid components and/or control the stored energy of the hybrid system, a special fault code is stored, the hybrid system is disabled and the "special fault clear required" flag is set. On the next or subsequent start-up of the hybrid control module based on a key input, a check will be made of the "special fault clear required" flag. If this flag is set, then a check of the SDI is executed. If the SDI is removed, it is understood that a repair has been made and the "special fault clear required" flag can be cleared, but the hybrid system will remain disabled while waiting for the key to be moved to the off position. Once the controller is powered down the SDI is replaced. If, on initial check, the SDI is still in place, then the hybrid system will remain disabled and the flag will remain set while waiting for the key to be moved to the off position and a subsequent key-on event with the SDI removed. On the key-on signal after the detection that the SDI was removed, the hybrid system can be re-enabled and faults can be cleared for normal operation. If a power up check tells the service technician that the "special fault clear required" flag is clear, then the hybrid system is enabled.

With continued reference to FIG. 6, the system flow of information and decision logic begins with a key-on event 500 in order to power up the controller of the hybrid system. The controller is constructed and programmed to first make an assessment at 502 of whether any "special fault" flag has been set. If a special fault has been detected and the flag set, then that special fault must be cleared before the hybrid system can be enabled. If the controller determines that there is no flag set for a "special fault", then the logic flow is to the fault monitoring stage 504, essentially asking if any fault has occurred. If no fault has occurred (i.e. been detected), then the hybrid system is enabled at 506. With the hybrid system enabled, the next event which is monitored is the key-off event at 508.

If a key-off event has not occurred, then the logic flow, via line 510, goes back to the fault monitoring stage 504. This cyclic decision loop continues until there is a key-off event at which point the controller is powered down at 512. So long as a fault is not detected and there is not a key-off event, the logic flow loop 504-506-508 cyclically continues. The sampling rate is settable by the controller.

Continuing with the "no flag set" status at 502, what is the logic flow if at stage 504 a fault has occurred? If a fault has been detected by the controller at stage 504, the controller sets a fault indication 514 and the hybrid system is disabled at 516. This step is important for safety considerations so that the hybrid system will not be put at risk until such time as the nature of the fault can be assessed. If the type or nature of the fault does not require special clearing 518 (also see status at 502), then the "no" line leads to another "key-off" decision stage 520. When the key is off (i.e. yes), the controller is powered down at 512. If the key is not off, a decision loop is provided as a way to keep checking for a "key-off" status. Once the controller is powered down at 512, the next key-on signal powers up the controller 500 and the controller flow logic as described herein resumes.

At stage 518 the controller provides the ability to distinguish a special fault from other "non-special" faults. If the type or category of fault requires a special fault clearing procedure, then a flag is set for the "special fault clear required" condition at 522. Once the flag is set, noting that the hybrid system is still disabled, the flow logic looks for the next key-off event at 520. The key-off event at 520 is tracked with a cyclic logic loop waiting on a key-off event at 520 to power down the controller at 512.

With the controller powered down, the next key-on event powers up the controller 500. The controller then makes an assessment at 502 of any flags being set such that a "special fault" needs to be cleared. The "no" branch has been described. As for the "yes" branch from 502, the next assessment by the controller is whether or not the SDI is removed at 524. If the SDI is not removed (line 526), then the hybrid system is disabled at 528. The logic of these stages is based on the controller having detected a "special fault" and accordingly, setting a flag for that special fault. According to the exemplary embodiment, the SDI needs to be removed as part of the repair/service protocol. If the SDI is not removed after a flag is set for a special fault, then the hybrid system is not enabled. The hybrid system remains disabled until there is a key-off input (i.e. signal) at 520, followed by a key-on signal at 500, with the SDI removed 524.

Even with the SDI removed at 524, there is still a command from the controller to disable the hybrid system 528. In this process and flow logic, the flag which was set for the special fault is cleared at 530. With the flag at 530 cleared, the next key-off event followed by a key-on event returns the control logic to the 504-506-508 loop until the next fault is detected. Until that next fault event, the hybrid system remains enabled at 506. The SDI is returned to its operable position within the hybrid system following whatever service or repair was needed to be performed. Since the hybrid system was disabled at 528, the conclusion of the service/repair still requires a key-off input in order to reset the hybrid system.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A method of servicing a hybrid system with a detected fault, said hybrid system having a controller and a service detection interlock (SDI), said method comprising the following steps:
   a) powering up said controller;
   b) assessing a service action fault flag status;
   c) if a service action fault flag is set, checking to see if the SDI is removed;
   d) if the SDI is removed, clearing the service action fault flag;
   e) disabling said hybrid system; and
   f) powering down the controller with a key-off input.

2. The method of claim 1 which further includes, when a service action fault flag is not set, the step of allowing the controller to monitor for other faults.

3. The method of claim 2 which further includes, if a fault is detected by the controller, the step of disabling the hybrid system.

4. The method of claim 3 wherein, if a fault is not detected, maintaining the hybrid system in an enabled status until either a fault is detected or there is a key-off event.

5. The method of claim 1 which further includes, if a fault is detected, the step of allowing the controller to assess whether the fault is a service action fault which requires the setting of a flag.

6. The method of claim 5 which further includes, if the detected fault is not a service action fault, the step of checking a key-off status.

7. The method of claim 6 which includes the step of cyclically checking the key-off status.

8. The method of claim 5, which further includes, if the detected fault is a service action fault, the step of setting a flag for said service action fault which must be cleared to enable the disabled hybrid system.

9. The method of claim 8 which includes the step of cyclically checking the key-off status.

10. The method of claim 1 which further includes, if a fault is detected by the controller, the step of disabling the hybrid system.

11. The method of claim 1 wherein, if a fault is not detected, maintaining the hybrid system in an enabled status until either a fault is detected or there is a key-off event.

12. The method of claim 1 which further includes, if a fault is detected, the step of allowing the controller to assess whether the fault is a service action fault which requires the setting of a flag.

13. A method of servicing a disabled hybrid system which includes a controller and a service disconnect interlock (SDI) component and which has a service action fault flag set, said method comprising the following steps:
   a) removing said SDI;
   b) powering up the controller;
   c) clearing the service action fault flag in conjunction with servicing of the disabled hybrid system;
   d) replacing said SDI; and
   e) executing a key-off command.

14. An energy storage module for use in a hybrid electric vehicle, said energy storage module comprising:
   an enclosure;
   means for storing energy generated by said hybrid electric vehicle, said means being interior to said enclosure;
   a voltage junction box exterior to said enclosure; and
   a removable service disconnect interlock electrically connected between said means for storing energy and said voltage junction box, said removable service disconnect interlock being constructed and arranged to break a current path between said means for storing energy and said voltage junction box when removed, wherein said removable service disconnect interlock is controlled by fault detection logic which is constructed and arranged to detect a fault which requires a repair to be performed in order to protect a portion of the hybrid electric vehicle.

15. The energy storage module of claim 14 wherein when a fault is detected, the fault detection logic is constructed and arranged to require a key-on/key-off cycle to be performed before the hybrid electric vehicle can be re-enabled.

16. The energy storage module of claim 14 which further includes a low-voltage connector.

17. The energy storage module of claim 16 wherein said removable service disconnect interlock is controlled by fault detection logic.

18. An energy storage module for use in a hybrid electric vehicle, said energy storage module comprising:
   an enclosure;
   means for storing energy generated by said hybrid electric vehicle, said means being interior to said enclosure;
   a voltage junction box exterior to said enclosure; and
   a removable service disconnect interlock electrically connected between said means for storing energy and said voltage junction box, said removable service disconnect interlock being constructed and arranged to break a current path between said means for storing energy and said voltage junction box when removed, wherein said removable service disconnect interlock is controlled by fault detection logic which is constructed and arranged to distinguish a service action category of faults from other faults which are not in said service action category.

19. The energy storage module of claim 18 which further includes a low-voltage connector.

20. The energy storage module of claim 19 wherein said removable service disconnect interlock is controlled by fault detection logic.

* * * * *

UNITED STATES PATENT AND TRADEMARK OFFICE
CERTIFICATE OF CORRECTION

PATENT NO. : 9,555,800 B2
APPLICATION NO. : 14/599764
DATED : January 31, 2017
INVENTOR(S) : Hynes et al.

It is certified that error appears in the above-identified patent and that said Letters Patent is hereby corrected as shown below:

In the Claims

In Claim 1, Column 11, Line 8, please delete the word "detection" and replace it with the word --disconnect--.

Signed and Sealed this
Eighteenth Day of April, 2017

Michelle K. Lee
*Director of the United States Patent and Trademark Office*